United States Patent
Tofano

(10) Patent No.: US 8,572,053 B2
(45) Date of Patent: Oct. 29, 2013

(54) DE-DUPLICATION INDEXING

(76) Inventor: Jeffrey Vincent Tofano, San Jose, CA (US)

( * ) Notice: Subject to any disclaimer, the term of this patent is extended or adjusted under 35 U.S.C. 154(b) by 332 days.

(21) Appl. No.: 12/963,914

(22) Filed: Dec. 9, 2010

(65) Prior Publication Data

US 2012/0150823 A1  Jun. 14, 2012

(51) Int. Cl.
*G06F 17/30* (2006.01)
(52) U.S. Cl.
USPC .......................................... 707/692
(58) Field of Classification Search
USPC ........................................ 707/692; 711/216
See application file for complete search history.

(56) References Cited

U.S. PATENT DOCUMENTS

| | | | |
|---|---|---|---|
| 8,131,924 B1 * | 3/2012 | Frandzel et al. | 711/113 |
| 2010/0250501 A1 * | 9/2010 | Mandagere et al. | 707/692 |
| 2010/0306412 A1 * | 12/2010 | Therrien et al. | 709/247 |
| 2011/0040951 A1 * | 2/2011 | Akirav et al. | 712/4 |
| 2012/0124307 A1 * | 5/2012 | Ashutosh et al. | 711/162 |

OTHER PUBLICATIONS

Examinine Binning: scalable . . . File back up, 2007, Bhagawat.*

* cited by examiner

*Primary Examiner* — Pierre Vital
*Assistant Examiner* — Sabana Rahman

(57) ABSTRACT

Example apparatus, methods, and computers support data de-duplication indexing. One example apparatus includes a processor, a memory, and an interface to connect the processor, memory, and a set of logics. The set of logics includes an establishment logic to instantiate one-to-many de-duplication data structures, a manipulation logic to update the dedupe data structure(s), a key logic to generate a key from a block of data to be de-duplicated, and a similarity logic to make a similarity determination for the block. The similarity determination identifies the block as a unique block, a duplicate block, or a block that meets a similarity threshold with respect to a stored de-duplicated block accessible through the dedupe data structure. The similarity determination involves comparing the block to be de-duplicated to a stored block available to the apparatus using a byte-by-byte approach, a hash approach, a delta hash approach and/or a sampling sequence approach.

16 Claims, 11 Drawing Sheets

US 8,572,053 B2

DE-DUPLICATION INDEXING

BACKGROUND

Conventional hash based de-duplication relies on a one-to-one hash-based index. The conventional hash-based index maintains a one-to-one relationship between hashes and blocks previously processed and stored by a de-duplication process. The hash-based index supports making a binary duplicate/unique decision for a sub-block in one logical step. The hash of a block is used as a key into the index. If there is a value in an entry at the location identified by the key, then the block that generated the key (e.g., hash) is a duplicate. Data de-duplication may be referred to as "dedupe".

Conventional dedupe includes chunking a larger data item (e.g., object, file) into sub-blocks, computing hashes for the sub-blocks, and processing the hashes instead of the sub-blocks. Chunking includes selecting boundary locations for fixed and/or variable length sub-blocks while hashing includes computing a hash of the resulting chunk. A chunk may also be referred to as a sub-block. Comparing relatively smaller hashes (e.g., 128 bit cryptographic hash) to make a unique/duplicate decision can be more efficient than comparing relatively larger chunks (e.g., 1 kB, 128 kB, 1 MB) of data using a byte-by-byte approach. Dedupe based on a unique/duplicate determination based on strong cryptographic hashes provides benefits for data reduction but may become expensive and infeasible with respect to data structure storage space and processing time.

The traditional dedupe index has maintained a one-to-one relationship between unique chunks and their hashes and related data. Over time, as the amount of indexed data has grown, conventional hash based processing and indexing have experienced challenges with respect to processing time and storage size. An index may grow so large that it is infeasible and/or impossible to hold it in the memory of a computer. Thus, conventional dedupe may suffer significant time delays when even a portion of the index is stored on disk instead of in memory. These challenges were previously unknown since indexes and stored data sets of the size, nature, and complexity of those processed by de-duplication applications were unknown.

BRIEF DESCRIPTION OF THE DRAWINGS

The accompanying drawings, which are incorporated in and constitute a part of the specification, illustrate various example methods, apparatuses, and other example embodiments of various aspects of the invention described herein. It will be appreciated that the illustrated element boundaries (e.g., boxes, groups of boxes, other shapes) in the figures represent one example of the boundaries of the elements. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
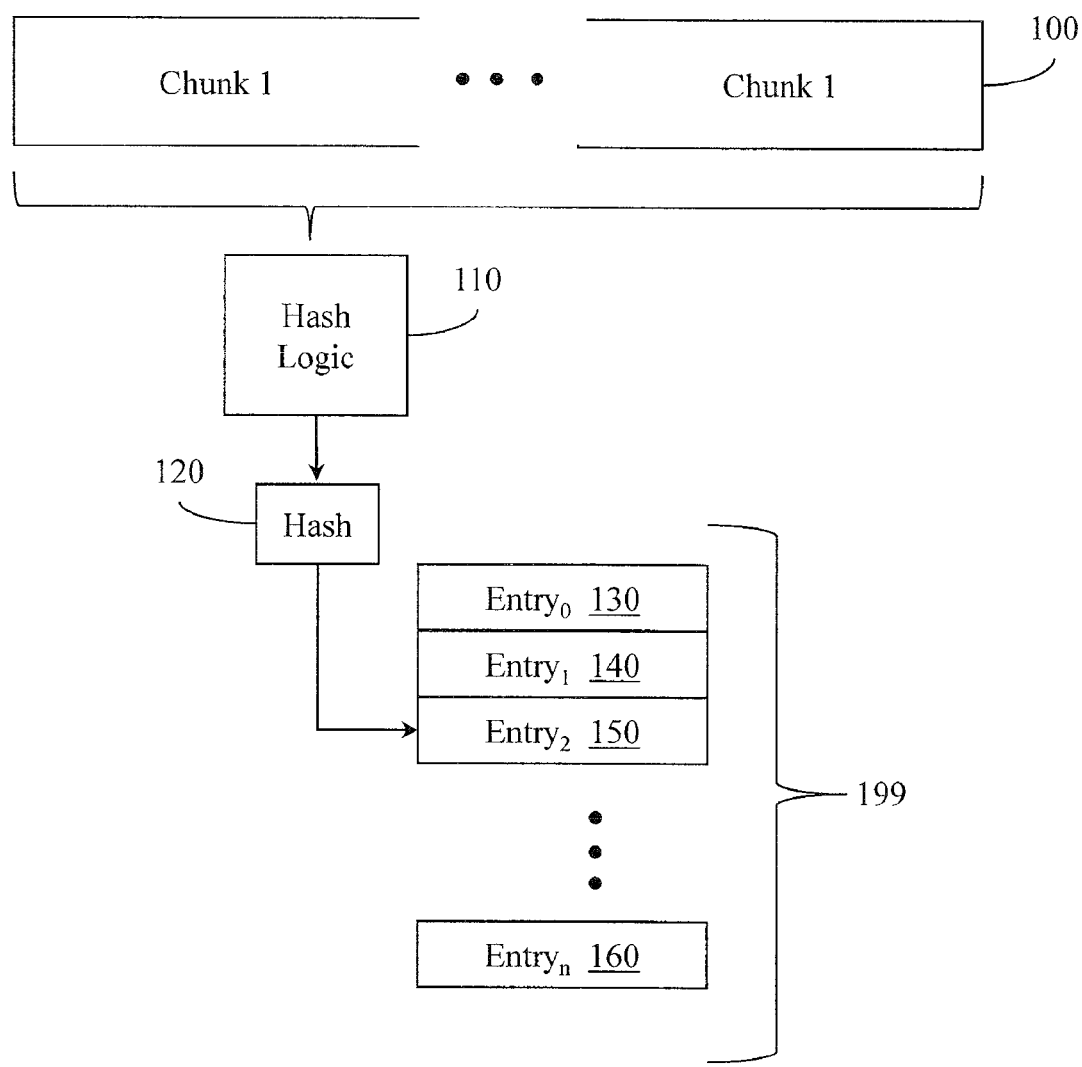
FIG. 1 illustrates taking a hash of a chunk and accessing a hash-based one-to-one index.

Example one-to-many dedupe indexing replaces traditional one-to-one hash-based dedupe indexing. Example systems and methods do not maintain a one-to-one hash-based index but instead maintain one or more one-to-many data structures that support resolving a unique/duplicate and/or a unique/duplicate/similar determination. Additionally, the data structure may support making a determination of whether it is worth spending the time to refine a unique/duplicate/similar determination. In one embodiment, a chunk is sampled and the sample is used as a key into a first data structure. In another embodiment, a chunk is hashed using a weak hash function that may be prone to collisions. However, the hash function may be designed so that collisions only occur between similar chunks. In this embodiment, the weak hash may be used as a key into a first data structure. In both embodiments, the first data structure may provide information leading to other data structures, stored blocks, and/or processes that can be used to resolve the unique/duplicate/similar determination.

Example sample-based one-to-many indexing supports resolving and/or terminating a unique/duplicate/similar determination for a sub-block in multiple logical steps. Example sample-based, one-to-many indexing uses a sampling sequence based data structure(s) (e.g., index) to find interesting locations in other data structures or collections of sub-blocks. Example sample-based, one-to-many indexing provides efficient hints to locations. The hints, if followed, lead to sub-blocks upon which a unique/duplicate/similar determination can be made. Example non-sample-based (e.g., weak hash based) one-to-many indexing also supports resolving a unique/duplicate/similar determination in multiple logical steps by following hints.

Sampling refers to analyzing a relatively smaller subset of a relatively larger set of data. For example, given a relatively larger block of data (e.g., 64 kB), a relatively smaller number of locations (e.g., 16) may be "sampled". The sample may be used as a key into a data structure (e.g., index). The data structure stores information for locating other sub-blocks. The other sub-blocks may be compared to the sub-block being processed to resolve the unique/duplicate/similar determination.

This is a fundamentally different approach to dedupe data structures. This approach no longer relies primarily and/or initially on cryptographic hashes to identify and/or locate unique and/or duplicate sub-blocks using a single, one-to-one, hash-based index. Instead, example systems and methods rely on one or more, one-to-many data structures (e.g., indexes). The data structure(s) support multi-tier probability based processing that may yield decisions including, but not limited to, terminating a unique/similar/duplicate determination and just storing the sub-block, that the sub-block is a duplicate to a previously encountered sub-block and should not be stored, that the sub-block is a unique sub-block and should be stored in its entirety, that the sub-block is a unique sub-block but is so similar to another sub-block that it should be stored as a set of differences (e.g., delta chunk) from the other sub-block, and that the sub-block is so similar to an already stored sub-block that it shouldn't be stored at all and that the similar sub-block should be used instead. The final decision may make sense for certain types of data (e.g., voice, video, music) where a certain number of errors or differences can be tolerated. For example, if a 64-bit color code for a pixel is off by one bit the difference in the resulting color may be so subtle that it would not be noticed and is acceptable for some applications like displaying real-time video on anything less than an HDTV (e.g., display on a cellular telephone).

FIG. 1 illustrates taking a hash of chunk1 100. Conventionally, hash logic 110 would consider the entire contents of chunk1 100 and produce hash 120. Hash 120 may be, for example, a 128 bit cryptographic hash computed from the entire contents of chunk1 100. Hash 120 would then be used as a key value for accessing one-to-one, hash-based index 199. For example, the key/hash 120 could correspond to one of the entries (e.g., $entry_0$ 130, $entry_1$ 140, and $entry_2$ 150 through $entry_n$ 160) in index 199. If there is a value at the location corresponding to hash/key 120, then chunk1 100 is a duplicate. If there is not a value at the location corresponding to hash/key 120, then chunk1 is a unique. Knowing whether chunks are unique or duplicates is useful for one-step exact duplicate processing. However, one-step exact duplicate processing may lead to challenging data structures. Consider hash 120. If hash 120 is a 128-bit strong, cryptographic hash, then index 199 will have $2^{128}$ entries. This large number of entries is used to reduce the likelihood of collisions that would frustrate one-step unique/duplicate determinations. More generally, if hash 120 has n bits, (n being an integer), then index 199 will have $2^n$ entries. Thus, index 199 may become too large to store in memory or to distribute across collaborating computers. If even a portion of index 199 is stored on disk or on some other slower device, then dedupe may experience significant processing time challenges.

Figure 2:
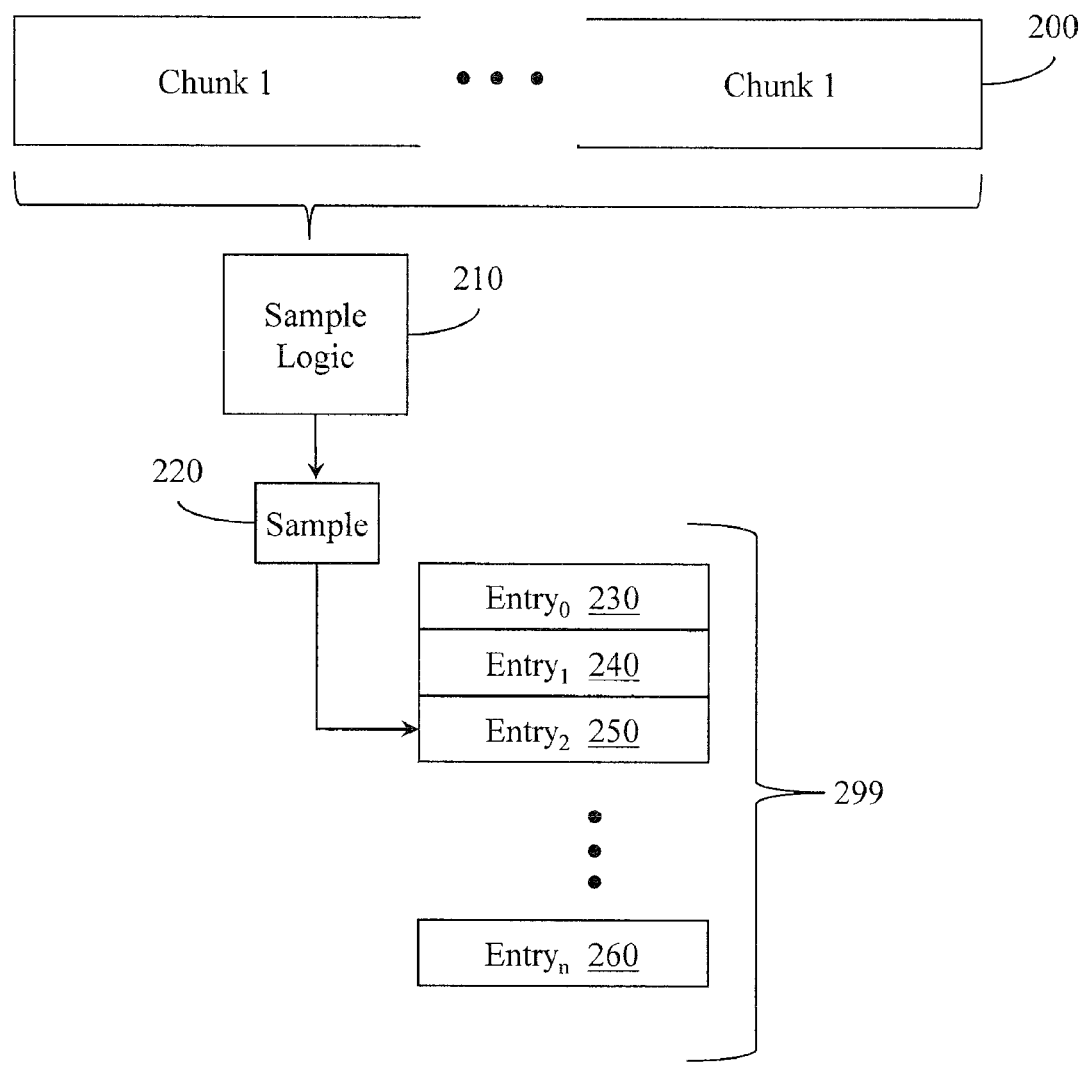
FIG. 2 illustrates sampling a chunk and accessing a sample-based one-to-one index.

Example systems and methods may not rely on an initial strong cryptographic hash as a key into a one-to-one, hash-based index. In some embodiments, example systems and methods instead rely on a sample as a key into a sample-based index. FIG. 2 illustrates chunk1 200 being sampled by sample logic 210 to produce a sample 220. One skilled in the art will appreciate that different numbers of sample locations having different sizes and positioned at different locations may be employed. In one example, the sample 220 is used as a key into sample-based index 299. Thus, the sample/key 220 can correspond to one of the entries (e.g., $entry_0$ 230, $entry_1$ 240, and $entry_2$ 250 through $entry_n$ 260) in index 299. If there is a value at the entry located by the sample/key 220, then there is a block to be considered for resolving the unique/duplicate/similar determination being made for chunk1 200. If there is no value at the entry located by the sample/key 220, then there are no blocks to be considered for resolving the unique/duplicate/similar determination. Note that many chunks could yield the same sample 220. Thus, index 299 is not used to resolve a unique/duplicate decision in a single step like a one-to-one hash-based index. Instead, index 299 is used to find blocks, data structures, or processes for resolving whether chunk1 200 is a unique/duplicate/similar block. This breaks the conventional reliance on one-to-one hash-based indexes. While a sample 220 is illustrated, other example systems and methods may use a weak hash as the key into a first data structure. Since multiple data structures and/or logical steps will be used to make a unique/duplicate/similar determination, a traditionally fatal key/hash collision can be tolerated. This also facilitates breaking the reliance on the traditional one-to-one hash-based index.

Consider a 64 kB block. A conventional system might compute a 128-bit cryptographic hash for the block that could uniquely identify the block and allow exact duplicate determinations to be made based on the hash. While this one-step binary unique/duplicate decision is very powerful, it is also expensive in terms of data structure space due to the one-to-one $2^{128}$ entry index required. Also, there is the ever present danger of a hash collision. Example systems and methods will instead use a different key into a one-to-many data structure. In one embodiment, a block will be sampled at a small number (e.g., 8, 64) locations to produce a sample sequence. The sample sequence can then be used directly as a key and/or indirectly as a value from which a key is computed to access a one-to-many data structure. Similarly, a short hash may be produced. The short hash can then be used directly as a key and/or indirectly as a value from which a key is computed to access a one-to-many data structure.

Using a sample or a short hash as a key is computationally and algorithmically similar to using a hash as a key, however the index lookup may occur in a more constrained space. The maximum number of stored sampling sequences is defined by the length of the sequence and the number of characters in the alphabet. If there are 128 possible symbols and 4 sample locations, there are at most 128×128×128×128 possible sample sequences ($2^7 \times 2^7 \times 2^7 \times 2^7 = 228$). Conversely, for a 128 bit hash, the matching space is defined by $2^{128}$ entries. While $2^{28}$ sampling sequences are readily stored in an index that can be stored in memory, those $2^{28}$ sampling sequences do not provide definite duplicate decisions. Instead, the sampling sequences act as a key into a data structure(s) that stores information from which the duplicate/unique/similarity determination can be resolved. The information can include stored sub-blocks, entry points to other data structures, process entry points, and so on. Using a one-to-many index also facilitates clustering related entities, which facilitates clustering related data, which may lead to fewer random accesses.

Figure 3:
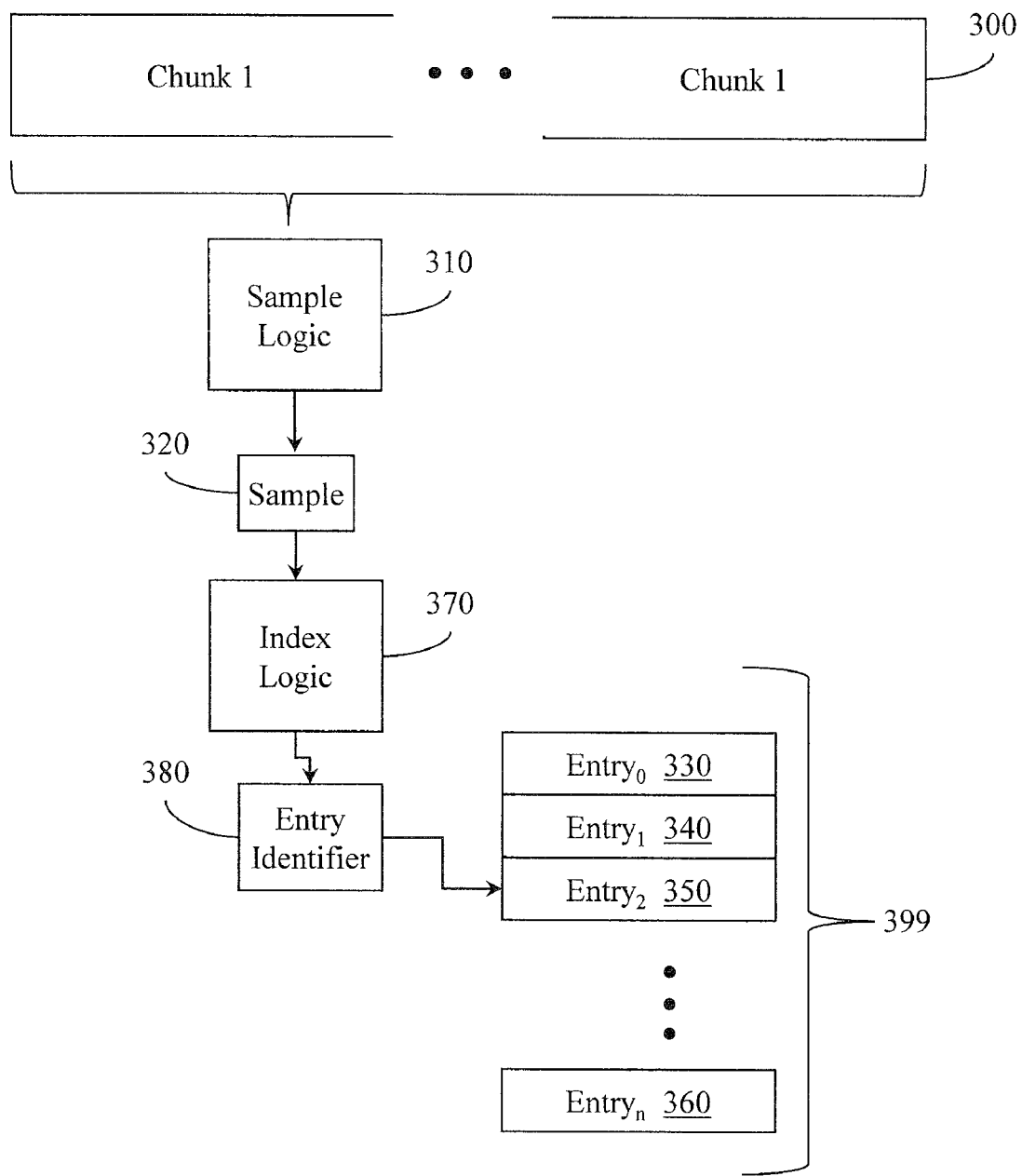
FIG. 3 illustrates sampling a chunk and accessing a one-to-many index.

FIG. 3 illustrates chunk1 300 being sampled by a sample logic 310 that produces a sample 320. The sample 320 may include data selected from different locations in chunk1 300. An index logic 370 processes sample 320 to produce an entry identifier 380. The entry identifier 380 may be, for example, a key for an index, an entry point to a tree, an entry point to a linked list, an entry point to a graph, and so on. Rather than using the sample 320 directly as a key into index 399, the sample 320 can be processed. While a sample 320 is illustrated, sample logic 310 could produce a weak hash or other identifier of chunk1 300. This other identifier could also be provided to index logic 370 for processing into an entry identifier 380. The entry identifier 380 could take different forms. In one example, the entry identifier 380 could just be a key value. In another example, the entry identifier 380 could identify which of a number of data structures are to be accessed, and also include a key value. By way of illustration, different chunks may have different entropy. Different data structures may be appropriate for processing chunks having different entropy. Therefore, sample logic 310 may, as part of its processing, not only provide a sample 320, but may also estimate the entropy for chunk1 300. Entropy is a measure of uncertainty associated with the randomness of data in an object to be data reduced. The entropy of data that is truly random is one. The entropy of a long string of duplicate characters is nearly zero. The entropy of most data falls between these two limiting examples. The index logic 370 may therefore produce the entry identifier 380 not only based on data extracted from chunk 1 300, but also on an attribute of chunk1 300.

Figure 4:
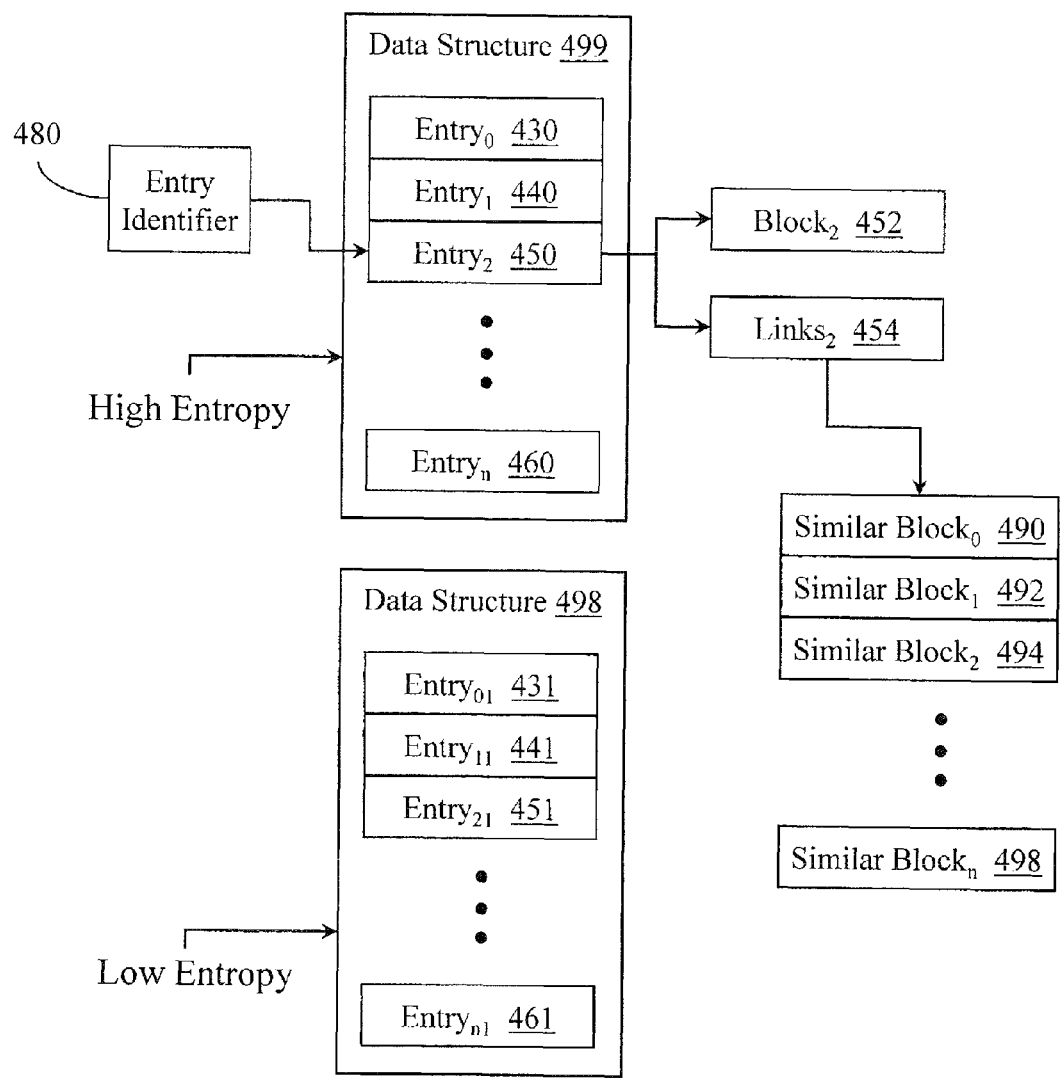
FIG. 4 illustrates accessing one of multiple one-to-many data structures.

FIG. 4 illustrates a data structure 499 that has multiple entries (e.g., entry$_0$ 430, entry$_1$ 440, and entry$_2$ 450 through entry$_n$ 460) and a data structure 498 that also has multiple entries (e.g., entry$_{01}$ 431, entry$_{11}$ 441, and entry$_{21}$ 451 through entry$_{n1}$ 461). Data structure 499 may be accessed when the chunk being processed has high-entropy while data structure 498 may be accessed when the chunk being processed has low-entropy. While high and low entropy are described, different first level data structures may be provided for different types of data including, but not limited to, video data, music data, voice data, and XML (extensible markup language) data. The different data structures may provide links to sub-blocks, data structures, and/or processes optimized or enhanced to process different types of data. Having these multiple types of data structures recognizes that data dedupe is not performed in a vacuum, and that context information about the data being deduped is available. Performing dedupe as a function of that context information facilitates breaking away from the single step, one-to-one, hash-based index. Breaking away from the single step, one-to-one approach facilitates using emerging technologies like solid state devices for storing data structures and/or data.

In the example illustrated, entry identifier 480 is used to access data structure 499, where the entry identifier 480 maps to entry$_2$ 450. Entry$_2$ 450 provides information for locating block$_2$ 452. Entry$_2$ 450 also provides information about links$_2$ 454. In one example, block$_2$ 452 may represent the most recently seen sub-block that yielded the entry identifier 480. In another example, block$_2$ 452 may not even be a real block that has been de-duplicated. Instead, block$_2$ 452 may be a specially designed block that facilitates performing subsequent determinations. Links$_2$ 454 may provide information for locating similar blocks (e.g., 490, 492, and 494 through 498). In one example, the block being processed may be compared to blocks 490 through 498. The comparisons may proceed in parallel. The block being processed may also be compared to block 452. This comparison may also be performed in parallel. The comparison may take different forms. For example, the block being processed may be compared using byte-by-byte comparisons, additional sampling, similarity vectors, hash-based comparisons, and so on. The comparisons can provide information for resolving the unique/duplicate/similar determination. In one example, one or more similar blocks may be selected, and information about these blocks may be used to seek out additional blocks, which may in turn be used to seek out additional blocks, until the unique/duplicate/similar determination is resolved.

To visualize the difference between approaches, imagine an index that has a unique identifier for every person on the planet. This identifier may include a name, age, and other information (e.g., fingerprint, retinal scan). Since there are billions of people on the planet, the one-step, one-to-one unique identifier index would have billions of entries. When a person is processed, and a determination needs to be made whether this person has been seen before, the determination can be made in a single step using the one-to-one index. However, this index may be difficult to manage. Compare this to an approach that involves a first index that stores links to subsequent indexes. The key for the first index is the first letter of every possible name. Assuming there are 100 possible first letters, then the first data structure has 100 entries. If your name starts with A, a first decision concerns whether you have been seen before using the A data structures and processes. If your name starts with B, then a first decision concerns whether you have been seen before using the B data structures and processes. Additionally, there could be multiple first level data structures. If your name is written in a first character set (e.g., Basic Latin alphabet) then your name will be processed using the first character set data structures. If your name is written in a second character set (e.g., Greek alphabet), then your name will be processed using the Greek alphabet data structures. Having multiple one-to-many data structures facilitates partitioning the data dedupe problem space so that smaller data structures that can be held in memory can be employed and so that parallel processes can be applied.

Figure 5:
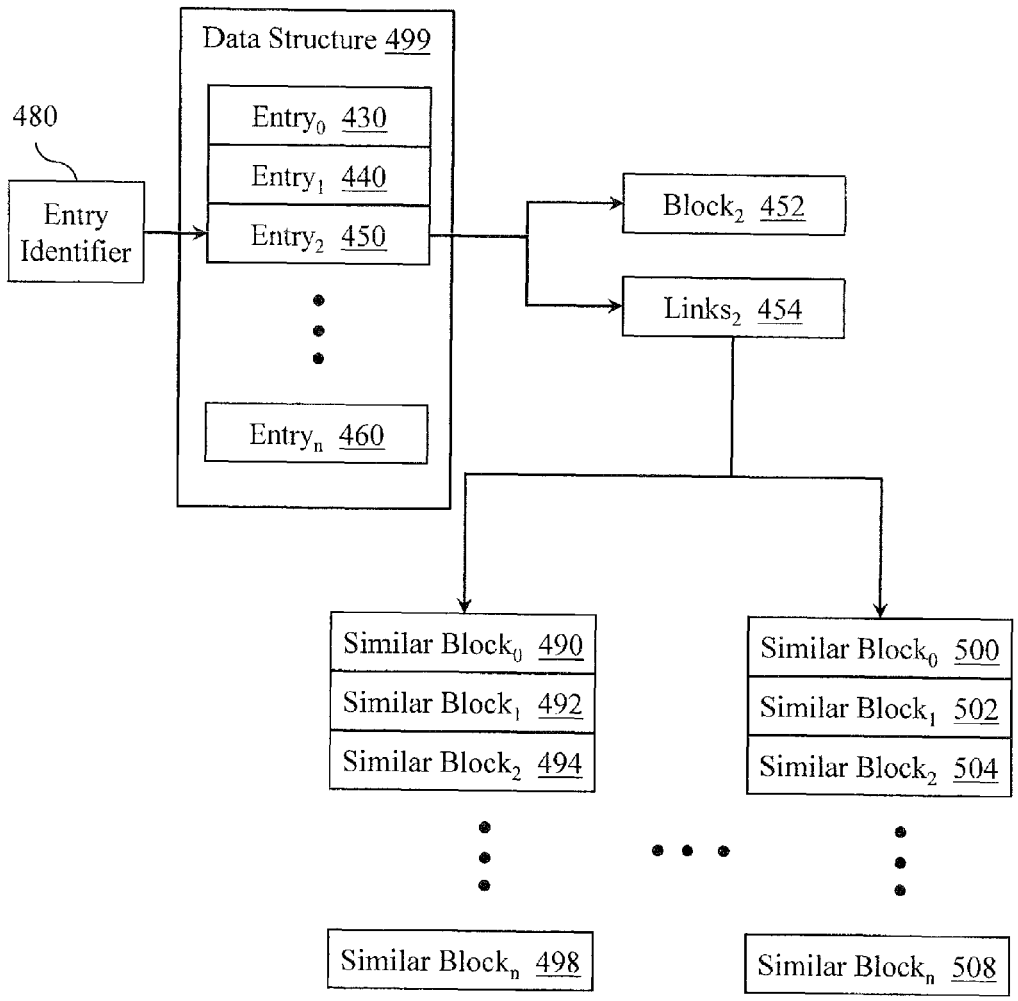
FIG. 5 illustrates accessing a one-to-many data structure that provides access to multiple sets of similar blocks.

FIG. 5 illustrates an example where parallel processing can be initiated in response to data retrieved from a one-to-many data structure. In FIG. 5, links$_2$ 454 provides links to multiple sets of potentially similar blocks. For example, links$_2$ 454 provides links to a first set that includes blocks 490, 492, and 494 through 498 and to a second set that includes blocks 500, 502, and 504 through 508. Links to other sets of blocks may also be provided. Returning to the naming example, a first set (e.g., 490-498) may include blocks where the second letter in your name is "a", a second set (e.g., 500-508) may include blocks where the second letter in your name is "b", and so on, through "z". The different data sets may have different numbers of blocks, and may be organized in different ways. For example, a first set may be organized as a linked list while a second set may be organized in a table. In different examples, the different sets may be processed in parallel.

Figure 6:
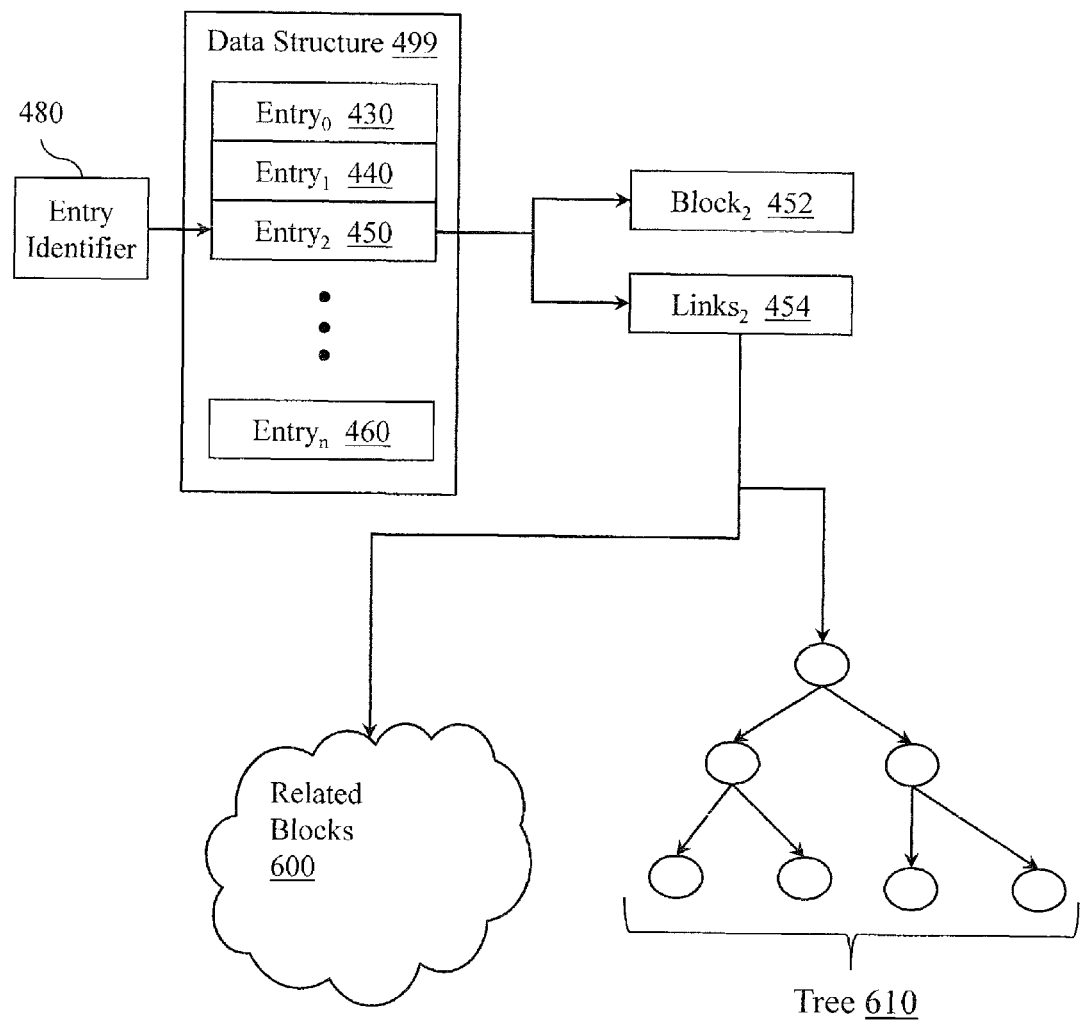
FIG. 6 illustrates accessing a one-to-many data structure that provides access to multiple sets of entry point data structures.

FIG. 6 illustrates an example where links$_2$ 454 does not lead to just lists of potentially similar blocks to which the block being processed can be compared. In this example, links$_2$ 454 provides information for accessing a set 600 of related blocks and for accessing a tree 610 that may be used to further parse the block to find related blocks. The non-leaf nodes in tree 610 may include information for parsing the block while the leaf nodes in tree 610 may store information about similar blocks. While a set 600 and a tree 610 are illustrated, one skilled in the art will appreciate that links$_2$ 454 may provide information for accessing different things.

Figure 7:
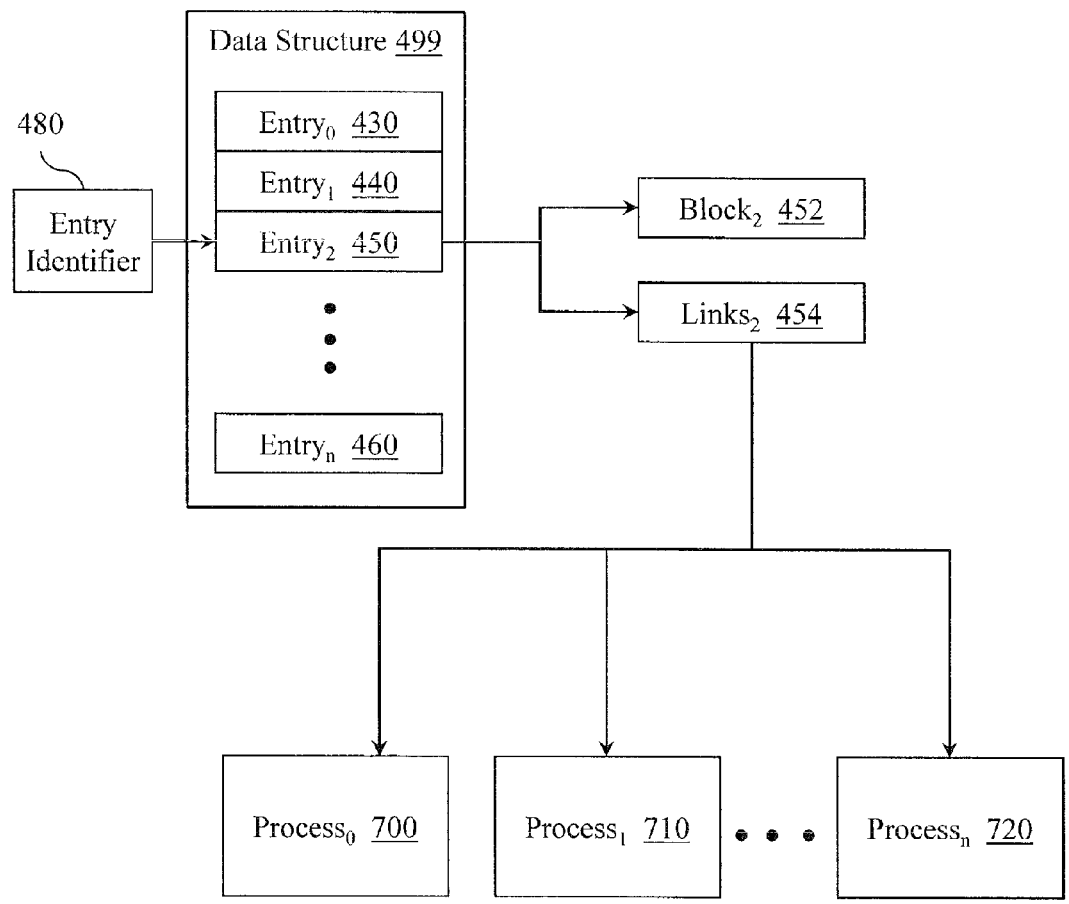
FIG. 7 illustrates accessing a one-to-many data structure that provides access to multiple de-duplication process entry points.

FIG. 7 illustrates an example where links$_2$ 454 does not point to data, but instead points to process entry points (e.g., process$_0$ 700 and process$_1$ 710 through process$_N$ 720). These different processes may be optimized and/or enhanced for resolving a unique/duplicate/similar determination for the many blocks that correspond to the one index entry in data structure 499. The processes may perform, for example, byte-by-byte comparisons, hash comparisons, similarity vector comparisons, and other comparisons. Rather than forcing all dedupe decisions to be single-step, hash-based index unique/duplicate determinations, example systems allow more flexibility and parallel processing by considering similarity between blocks instead of considering only a unique/duplicate property.

Figure 8:
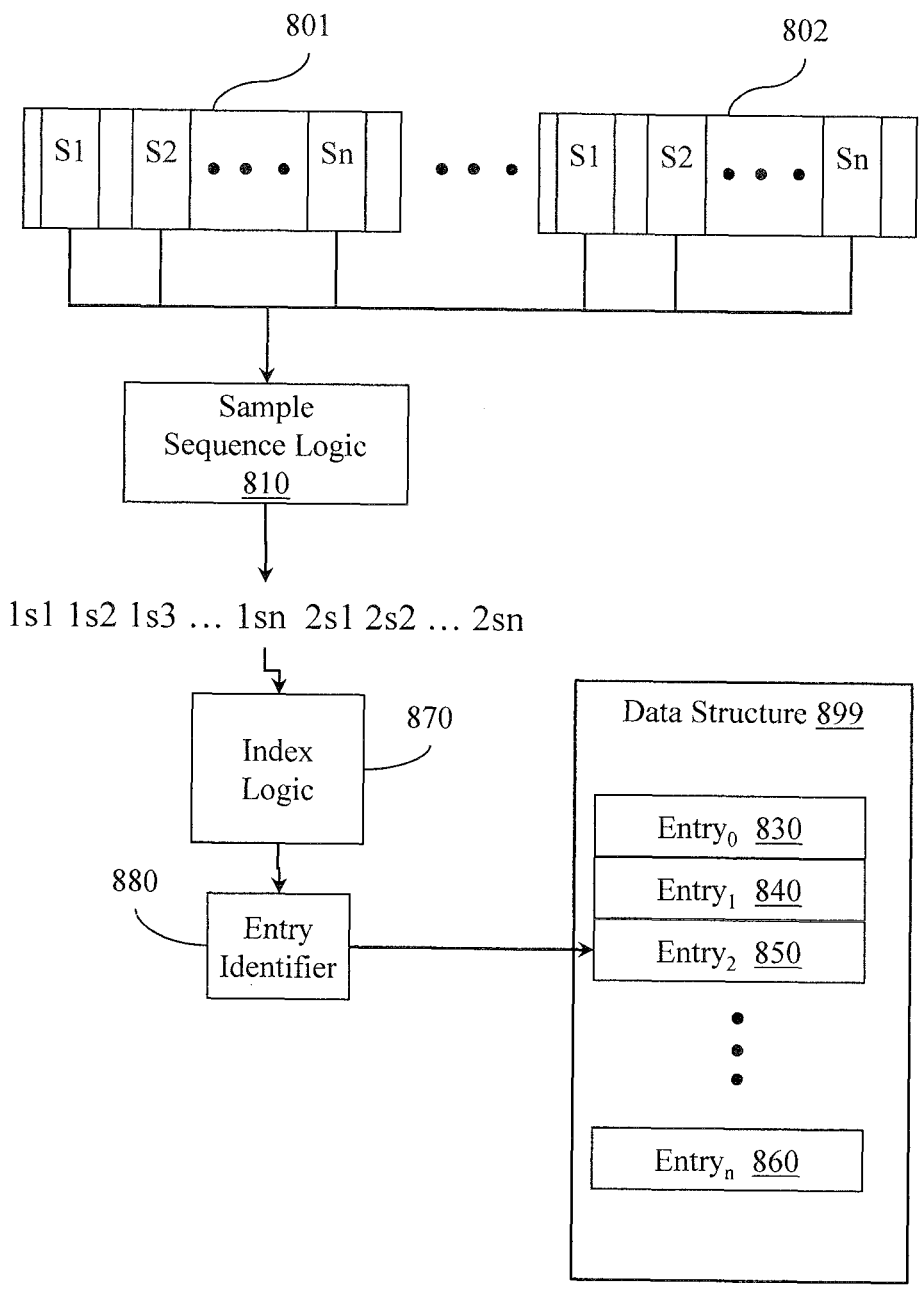
FIG. 8 illustrates accessing a one-to-many data structure using an aggregation of samples.

FIG. 8 illustrates two blocks being sampled and the samples being aggregated. A first block 801 and a second block 802 are sampled at locations $s_1$ and $s_2$ through $s_n$. The samples are provided to sample sequence logic 810, which produces an aggregate sample (e.g., $1s1\ 1s2\ 1s3\ \ldots\ 1sn\ 2s1\ 2s2\ \ldots\ 2sn$). Index logic 870 then produces an entry identifier 880 from the aggregate sequence provided by sample sequence logic 810. The entry identifier 880 is then used to access data structure 899 which includes entries 830, 840, and 850 through 860. A single entry may lead to multiple possible blocks or sub-blocks to be accessed to dedupe blocks 801 and 802.

Figure 9:
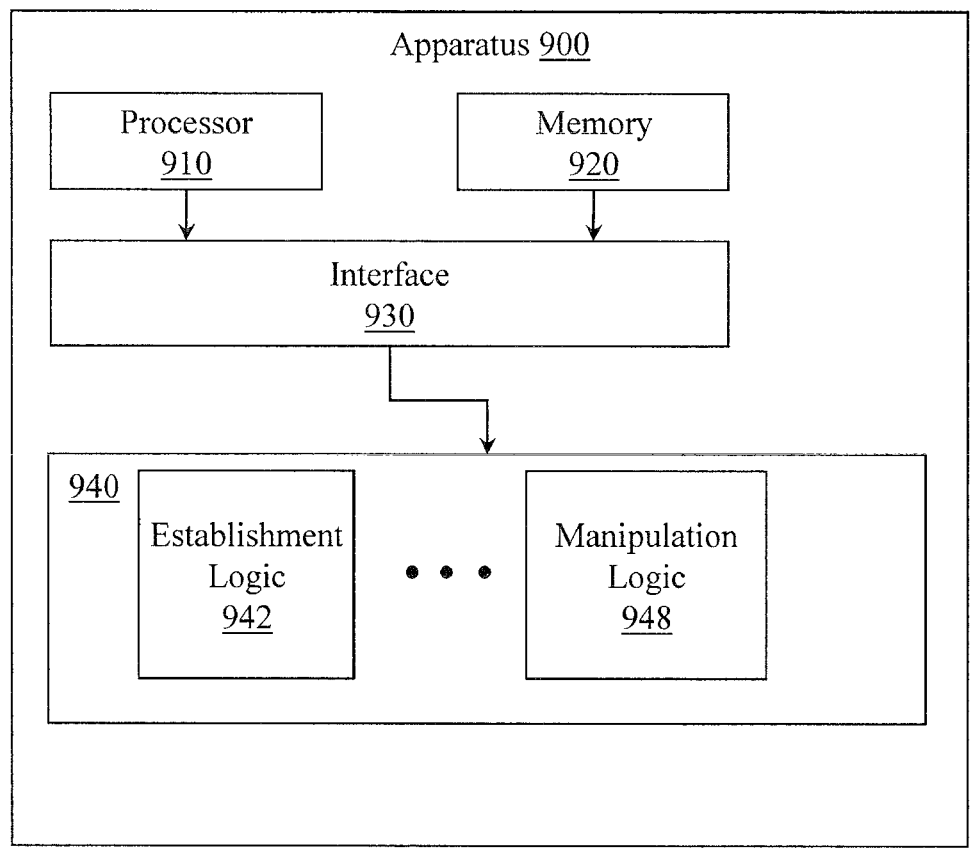
FIG. 9 illustrates an embodiment of an apparatus associated with one-to-many indexing.

FIG. 9 illustrates an apparatus 900. Apparatus 900 is configured to control de-duplication indexing. Controlling dedupe indexing can include building and populating dedupe data structures. Controlling dedupe indexing can also include using dedupe data structures to make a unique/duplicate/similar determination. Apparatus 900 includes a processor 910, a memory 920, and an interface 930. Interface 930 connects the processor 910, the memory 920, and a set 940 of logics (e.g., 942, . . . 948). In different embodiments, the logics may be, for example, circuits, integrated circuits, application specific integrated circuits (ASICs), computer executable processes, and other entities. Apparatus 900 can be configured to control de-duplication indexing.

In one embodiment, the set 940 of logics includes an establishment logic 942 and a manipulation logic 948. The establishment logic 942 may be configured to instantiate a first one-to-many de-duplication data structure. The dedupe data structure is configured to receive a key value and to return an item(s) that facilitates making a similarity determination for a block of data to be de-duplicated by apparatus 900. In different embodiments, the de-duplication data structure can take forms including, but not limited to, an index, a tree, a list, and a graph. In one example, the one-to-many de-duplication data structure is constrained to fit in the memory 920. In different embodiments, the key value can take forms including, but not limited to, a sample taken from a block of data to be de-duplicated, a hash computed from a block of data to be de-duplicated, a value computed from a block to be de-duplicated, and an aggregation of two or more samples taken from one or more blocks of data to be de-duplicated.

The manipulation logic 948 is configured to selectively update the one-to-many de-duplication data structure. Updating the dedupe data structure can include, but is not limited to including, adding an item that facilitates making the similarity determination, and deleting an item that facilitates making the similarity determination. The items that facilitate making a similarity determination include, but are not limited to, a block of data, a de-duplication data structure identifier, a de-duplication data structure entry identifier, a de-duplication process identifier, and a de-duplication process entry point. Unlike a unique/duplicate decision, apparatus 900 can produce a similarity determination that identifies a block being de-duplicated as items including, but not limited to, a unique block, a duplicate block, and a block that meets a similarity threshold with respect to a stored de-duplicated block accessible to the apparatus 900 through the one-to-many de-duplication data structure.

The establishment logic 942 can also be configured to instantiate additional one-to-many de-duplication data structures. The establishment logic 942 can also be configured to arrange the additional one-to-many de-duplication data structures to be reachable via the first one-to-many de-duplication data structure. Thus, a hierarchy of data structures can be configured to support multi-tier processing for similarity determinations. When a similarity determination is made, information that facilitates making a subsequent similarity determination may be available. Therefore, in one example, the manipulation logic 948 is configured to selectively update one or more one-to-many de-duplication data structures as a function of the similarity determination.

Figure 10:
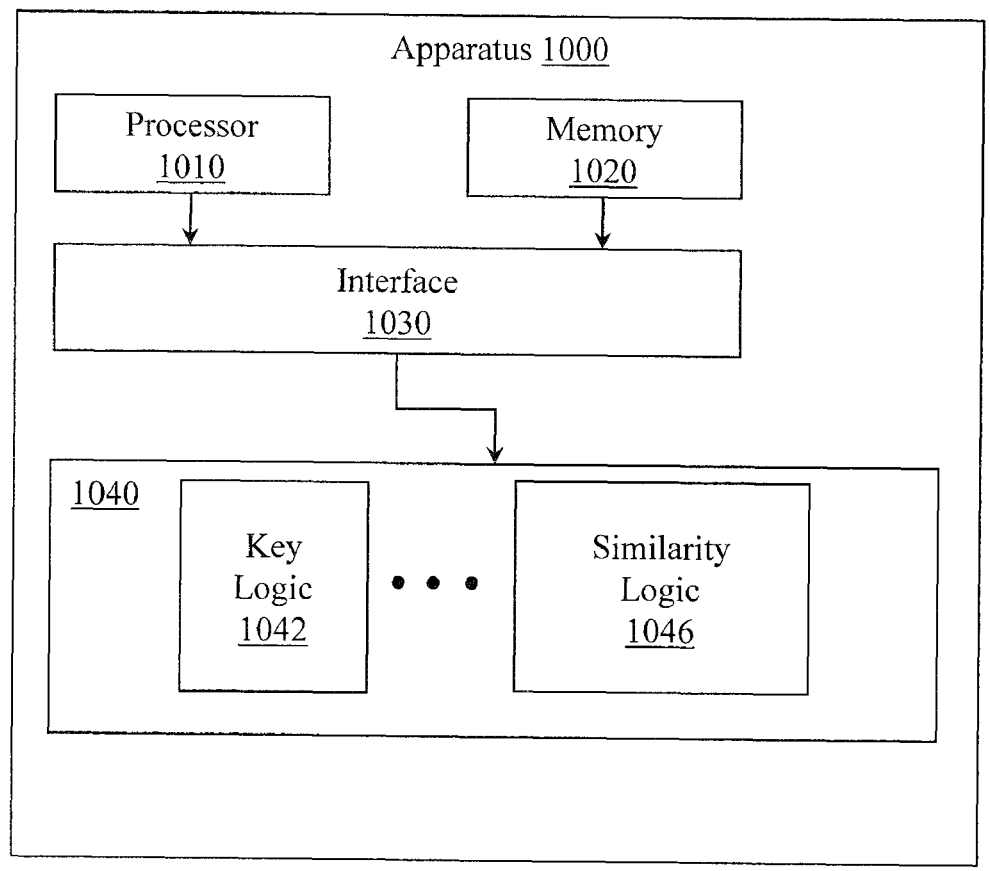
FIG. 10 illustrates another embodiment of an apparatus associated with one-to-many indexing.

FIG. 10 illustrates an apparatus 1000. Apparatus 1000 is also configured to control de-duplication indexing. Controlling dedupe indexing can include using dedupe data structures to make a unique/duplicate/similar determination. Apparatus 1000 includes a processor 1010, a memory 1020, and an interface 1030. Interface 1030 connects the processor 1010, the memory 1020, and a set 1040 of logics (e.g., 1042, . . . 1046). In different embodiments, the logics may be, for example, circuits, integrated circuits, application specific integrated circuits (ASICs), computer executable processes, and other entities.

In one embodiment, the set 1040 of logics includes a key logic 1042 and a similarity logic 1046. The key logic 1042 may be configured to generate a key value from a block of data to be de-duplicated. The key value is configured to access a one-to-many de-duplication data structure that is configured to receive a key value and to return an item that facilitates making a similarity determination for a block of data to be de-duplicated. The dedupe data structure may have been instantiated by, for example, establishment logic 942 (FIG. 9) and may have been manipulated by, for example, manipulation logic 948 (FIG. 9). Thus, the one-to-many de-duplication data structure can take forms including, but not limited to, an index, a tree, a list, and a graph and the key value can take forms including, but not limited to, a sample taken from a block to be de-duplicated, a hash computed from a block to be de-duplicated, a value computed from a block to be de-duplicated, and an aggregation of two or more samples taken from one or more blocks to be de-duplicated.

The similarity logic 1046 may be configured to make a similarity determination for the block of data as a function of the item. The item that facilitates making the similarity determination can take forms including, but not limited to, a block of data, a de-duplication data structure identifier, a de-duplication data structure entry identifier, a de-duplication process identifier, and a de-duplication process entry point. In one example, the similarity determination identifies a block being de-duplicated as one of, a unique block, a duplicate block, and a block that meets a similarity threshold with respect to a stored de-duplicated block accessible to the apparatus through the one-to-many de-duplication data structure.

Apparatus 1000 may have access to more than one dedupe data structure. Therefore, in one example, the key logic 1042 selects the one-to-many de-duplication data structure from two or more available one-to-many de-duplication data structures. The key logic 1042 may select the one-to-many de-duplication data structure based on factors including, but not limited to, an entropy associated with the block to be de-duplicated, a data type associated with the block to be de-duplicated, and the size of the block to be de-duplicated.

In one example, the similarity logic 1046 is configured to make the similarity determination by comparing the block to be de-duplicated to a stored block available to the apparatus 1000 through the one-to-many de-duplication data structure. The similarity logic 1046 may make the similarity determination using comparisons including, but not limited to, a byte-by-byte comparison between at least a portion of the block to be de-duplicated and at least a portion of the stored block, comparing a hash of at least a portion of the block to be de-duplicated to a hash of at least a portion of the stored block, comparing a delta hash associated with at least a portion of the block to be de-duplicated to a delta hash associated with at least a portion of the stored block, and comparing one or more additional sampling sequences associated with the block to be de-duplicated to one or more additional sampling sequences associated with the stored block. With multiple different comparisons possible, in one example, the similarity logic 1046 is configured to make the similarity determination by performing two or more comparisons in parallel. Delta hashes are described in UK patent number 1012107-7, filed Jul. 19, 2010, by the same inventor and assigned to the same assignee.

It may not be possible to make a similarity determination from the first block or set of blocks acquired from the first dedupe data structure. Therefore, apparatus 1000 may be configured to selectively repetitively generate key values and to selectively repetitively attempt to make similarity determinations until a threshold similarity for a block to be deduped is determined or until a determination is made not to continue. The determination not to continue may be made upon identifying a less than threshold likelihood of finding a duplicate or similar sub-block. Unlike a conventional system where every unique determination requires updating the one-to-one hash-based index, similarity logic 1046 may be configured to make the similarity determination without updating the one-to-many de-duplication data structure.

In one example, apparatus 1000 (FIG. 10) may be configured with the logics from apparatus 900 (FIG. 9) and in another example apparatus 900 (FIG. 9) may be configured with the logics from apparatus 1000 (FIG. 10).

Example systems and methods may perform dedupe indexing in different ways for data that is stored in different ways (e.g., archived, stored near-line, stored on-line). Archiving typically focuses on preserving documents or data in a form that has some sort of certifiable integrity. Archives are generally immune to unauthorized access and tampering, and can be the subject of record management operations (e.g., automatic deletion after a certain period, auditor-initiated retrieval). Archives are generally conceived to be an operational system for processing documents and/or data that are no longer in active use. Near-lining concerns holding data that is used less frequently than the most current data but that is used frequently enough that archiving may store the data too deeply. Near-line data is contrasted to online data, which will be the most currently used data. Near-line storage represents a compromise between online storage and offline storage (e.g., archive).

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations include physical manipulations of physical quantities. Usually, though not necessarily, the physical quantities take the form of electrical or magnetic signals capable of being stored, transferred, combined, compared, and otherwise manipulated in a logic. The physical manipulations transform electronic components and/or data representing physical entities from one state to another.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

Figure 11:
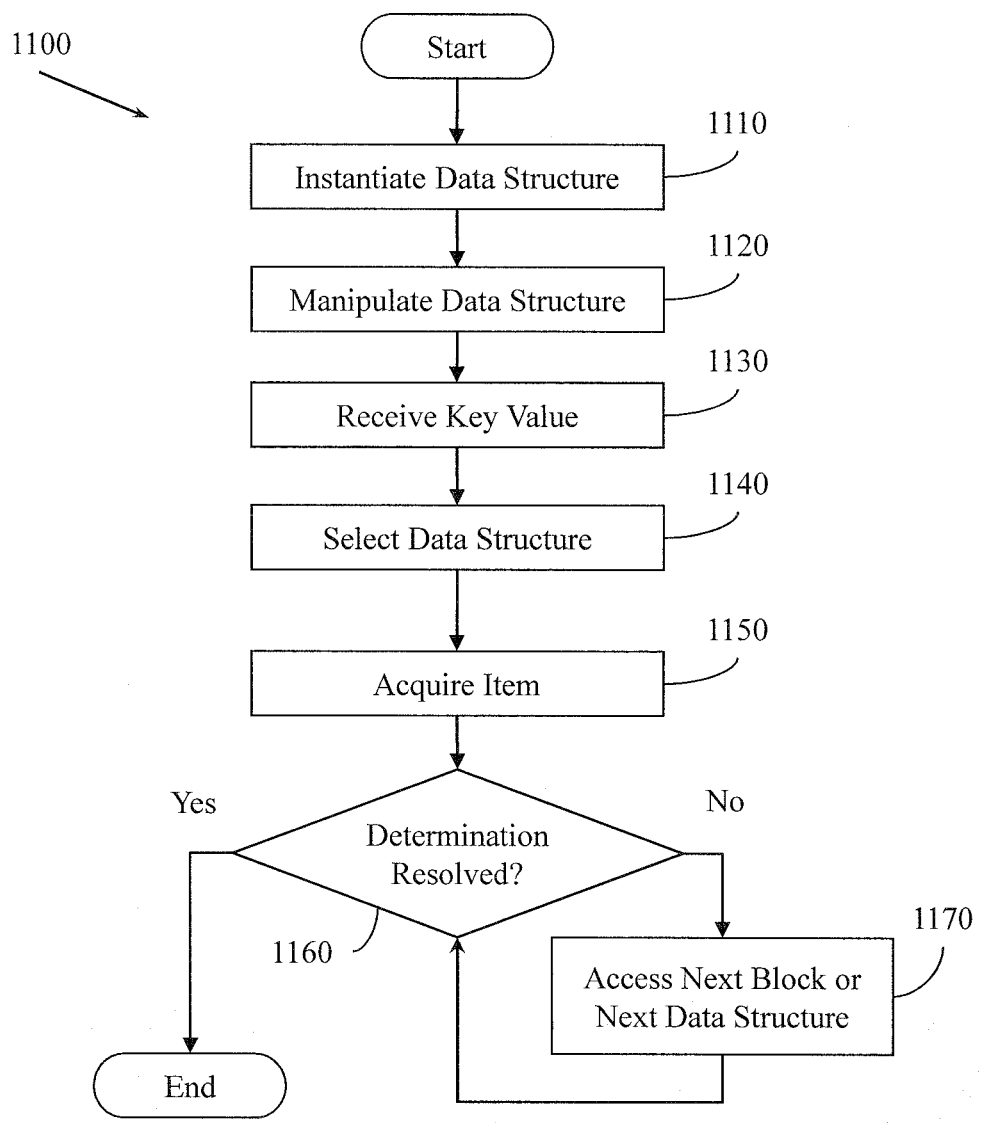
FIG. 11 illustrates a method associated with one-to-many de-duplication data structures.

FIG. 11 illustrates a method 1100 for controlling a data de-duplication computer to build and use de-duplication data structures. Building the data structures can include initiating and populating structures including a one-to-many index. Method 1100 includes, at 1110, controlling the data de-duplication computer to instantiate the one-to-many de-duplication data structure(s). Instantiating a dedupe data structure can include allocating memory, establishing initial values for data structure entries, identifying relationships between key values and entries, and so on.

Method 1100 also includes, at 1120, selectively manipulating (e.g., updating) the one-to-many de-duplication data structure. Updating the data structure can include adding an item that facilitates making the similarity determination, deleting an item that facilitates making the similarity determination, altering an item, and so on. One skilled in the art will appreciate that in some examples the updating at 1120 can occur throughout the lifetime of the data structure.

In some examples, the instantiating at 1110 may have already occurred and the processing may begin at 1130 where the dedupe data structure(s) will be used to make a similarity decision for a block to be deduped. Method 1100 can include, at 1130, receiving a key value associated with the block. In one example, the key value may be a sample or may be sample-based. While receiving a key value is described, in one embodiment method 1100 may produce the key.

With the key value in hand, method 1100 proceeds, at 1140, to select a one-to-many data de-duplication data structure to access using the key value. Different data structures may be available for different data types, different sized data, blocks whose boundaries were determined using fixed or data dependant approaches, and so on. After selecting the data structure, method 1100 proceeds, at 1150, to acquire an item from a location in the data de-duplication data structure. The location is a function of the key value, and the item identifies a set of items upon which a similarity determination for the block to be de-duplicated can be made.

At 1160, a decision is made concerning whether the similarity determination can be made based, at least in part, on the set of items. Upon determining that the set of items are insufficient to make a data de-duplication similarity determination for the block to be de-duplicated, method 1100 may loop repetitively through actions 1170 and 1160. At 1170, method 1100 may include generating additional keys associated with the block to be de-duplicated and/or items retrieved from dedupe data structures. The additional keys can then be used to select additional one-to-many data de-duplication data structures to access and additional items can be acquired from locations in the additional de-duplication data structures.

In one example, a method may be implemented as computer executable instructions. Thus, in one example, a non-transitory computer readable medium may store computer executable instructions that if executed by a computer (e.g., data reduction server) cause the computer to perform method 1100. While executable instructions associated with the above method are described as being stored on a computer readable medium, it is to be appreciated that executable instructions associated with other example methods described herein may also be stored on a computer readable medium.

The following includes definitions of selected terms employed herein. The definitions include various examples and/or forms of components that fall within the scope of a term and that may be used for implementation. The examples are not intended to be limiting.

References to "one embodiment", "an embodiment", "one example", "an example", and other similar terms indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" or "in one example" does not necessarily refer to the same embodiment or example.

"Computer readable medium", as used herein, refers to a medium that stores signals, instructions and/or data. A computer readable medium may take forms, including, but not limited to, non-volatile media, and volatile media. Non-volatile media may include, for example, optical disks, and magnetic disks. Volatile media may include, for example, semiconductor memories, and dynamic memory. Common forms of a computer readable medium may include, but are not limited to, a floppy disk, a flexible disk, a hard disk, a magnetic tape, other magnetic medium, an ASIC, a CD (compact disk), other optical medium, a RAM (random access memory), a ROM (read only memory), a memory chip or card, a memory stick, and other media from which a computer, a processor, or other electronic device can read.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, ABC, AAA, AAB, AABB, AABBC, AABBCC, and so on (e.g., the data store may store only A, only B, only C, A&B, A&C, B&C, A&B&C, A&A&A, A&A&B, A&A&B&B, A&A&B&B&C, A&A&B&B&C&C, and so on). It is not intended to require one of A, one of B, and one of C. When the applicants intend to indicate "at least one of A, at least one of B, and at least one of C", then the phrasing "at least one of A, at least one of B, and at least one of C" will be employed.

While example apparatus, methods, and articles of manufacture have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
   a processor;
   a memory; and
   an interface to connect the processor, the memory, and a set of logics, the set of logics comprising:
   an establishment logic configured to instantiate a first one-to-many de-duplication data structure that is configured to receive a key value and to return one or more items that facilitate making one or more of, a decision concerning whether a similarity determination is to be made, and a similarity determination for a block of data to be de-duplicated,
   where the key value is one of, a sample taken from the block of data, the sample being less than the entire block of data, a weak hash computed from the block of data, the weak hash being susceptible to hash collisions, the weak hash being unsuitable for a duplicate determination, and an aggregation of two or more samples taken from blocks of data to be de-duplicated,
   where the similarity determination classifies the block of data to be de-duplicated as being one of at least three items: a unique block, a duplicate block, or a block that meets a similarity threshold with respect to a stored de-duplicated block accessible to the apparatus through the one-to-man de-duplication data structure,
   where the one or more items that facilitate making the similarity determination are a de-duplication data structure identifier, a de-duplication data structure ent identifier a de-duplication process identifier or a de-duplication process entry point; and
   a manipulation logic configured to selectively update the one-to-many de-duplication data structure by performing one or more of, adding an item that facilitates making the similarity determination, and deleting an item that facilitates making the similarity determination.

2. The apparatus of claim 1, where the de-duplication data structure is one of, an index, a tree, a list, and a graph.

3. The apparatus of claim 1, where the one-to-many de-duplication data structure is configured to fit in the memory.

4. The apparatus of claim 1, where the establishment logic is configured to instantiate a second one-to-many de-duplication data structure and to arrange the second one-to-many de-duplication data structure to be reachable via the first one-to-many de-duplication data structure.

5. The apparatus of claim 1, where the manipulation logic selectively updates the first one-to-many de-duplication data structure as a function of a similarity determination associated with a block of data.

6. An apparatus, comprising:
   a processor;
   a memory; and
   an interface to connect the processor, the memory, and a set of logics, the set of logics comprising:
   a key logic configured to generate a key value from a block of data to be de-duplicated, where the key value is configured to access a one-to-many de-duplication data structure that is configured to receive a key value and to return an item that facilitates determining making a similarity determination for a block of data to be de-duplicated,
   where the key value is one of, a sample taken from the block of data, the sample being less than the entire block of data, a weak hash computed from the block of data, and an aggregation of two or more samples taken from blocks of data to be de-duplicated,
   where the key logic selects the one-to-many de-duplication data structure from two or more available one-to-man de-duplication data structures based on an entropy associated with the block, a data type associated with the block, the size of the block, or the probability that the block is a duplicate; and
   a similarity logic configured to make the similarity determination for the block of data to be de-duplicated, where the similarity determination is made as a function of the item, where the similarity determination identifies the block as being one of at least three items: a unique block, a duplicate block, or a block that meets a similarity threshold with respect to a stored de-duplicated block accessible to the apparatus through the one-to-many de-duplication data structure.

7. The apparatus of claim 6, where the one-to-many de-duplication data structure is one of, an index, a tree, a list, and a graph.

8. The apparatus of claim 6, where the item that facilitates making a similarity determination is one of, a block of data, a de-duplication data structure identifier, a de-duplication data structure entry identifier, a de-duplication process identifier, and a de-duplication process entry point.

9. The apparatus of claim 6, where the similarity logic is configured to make the similarity determination by comparing the block to be de-duplicated to a stored block available to the apparatus through the one-to-many de-duplication data structure, where the comparing comprises one or more of:
   a byte-by-byte comparison between at least a portion of the block to be de-duplicated and at least a portion of the stored block;
   comparing a hash of at least a portion of the block to be de-duplicated to a hash of at least a portion of the stored block;
   comparing a delta hash associated with at least a portion of the block to be de-duplicated to a delta hash associated with at least a portion of the stored block; and
   comparing one or more additional sampling sequences associated with the block to be de-duplicated to one or more additional sampling sequences associated with the stored block.

10. The apparatus of claim 9, where the similarity logic is configured to make the similarity determination by performing two or more comparisons in parallel.

11. The apparatus of claim 9, where the key logic is configured to selectively repetitively generate key values and where the similarity logic is configured to selectively repetitively make similarity determinations until a threshold similarity is determined.

12. The apparatus of claim 9, where the similarity logic is configured to make the similarity determination without updating the one-to-many de-duplication data structure.

13. An apparatus, comprising:
   a processor;
   a memory; and
   an interface to connect the processor, memory, and a set of logics, the set of logics comprising:
   an establishment logic configured to instantiate a first one-to-many de-duplication data structure that is configured to receive a value and to return one or more items that facilitate making a similarity determination for a block of data to be de-duplicated, where the one-to-many de-duplication data structure is configured to fit in the memory;
   a manipulation logic configured to selectively update the one-to-many de-duplication data structure by adding or deleting an item that facilitates making a similarity determination for a block of data to be de-duplicated;
   a key logic configured to generate a key value from a block of data to be de-duplicated, where the key value is configured to access the one-to-many de duplication data structure; and
   a similarity logic configured to make a similarity determination for the block of data as a function of the item, where the similarity determination identifies a block being de-duplicated as one of, a unique block, a duplicate block, and a block that meets a similarity threshold with respect to a stored de-duplicated block accessible to the apparatus through the one-to-many de-duplication data structure, where the similarity logic is configured to make the similarity determination by comparing the block to be de-duplicated to a stored block available to the apparatus through the one-to-many de-duplication data structure, where the comparing comprises one or more of:
   a byte-by-byte comparison between at least a portion of the block to be de-duplicated and at least a portion of the stored block;
   comparing a hash of at least a portion of the block to be de-duplicated to a hash of at least a portion of the stored block;
   comparing a delta hash associated with at least a portion of the block to be de-duplicated to a delta hash associated with at least a portion of the stored block; and
   comparing one or more additional sampling sequences associated with the block to be de-duplicated to one or more additional sampling sequences associated with the stored block.

14. A method, comprising:
   receiving a key value associated with a block to be de-duplicated;
   selecting a one-to-many data de-duplication data structure to access using the key value;
   acquiring an item from a location in the data de-duplication data structure, where the location is a function of the key value, and where the item identifies a set of items upon which a similarity determination for the block to be de-duplicated can be made; and
   performing one or more of, making the similarity determination based, at least in part, on the set of items, and deciding not to make the similarity determination.

15. The method of claim 14, comprising:
   upon determining that the set of items are insufficient to make a data de-duplication similarity determination for the block to be de-duplicated, repetitively:
   generating additional keys associated with one or more of, the block to be de-duplicated, and one or more of the set of items;
   selecting second one-to-many data de-duplication data structures to access using the additional keys;
   acquiring additional items from locations in the second data de-duplication data structures, where the locations are a function of the additional keys, and where the additional items identify additional sets of items upon which a similarity determination for the block to be de-duplicated can be made; and
   making the similarity determination based, at least in part, on the additional sets of items.

16. The method of claim 14, comprising:
   instantiating the one-to-many de-duplication data structure; and
   selectively updating the one-to-many de-duplication data structure by performing one or more of, adding an item that facilitates making the similarity determination, and deleting an item that facilitates making the similarity determination.

* * * * *

UNITED STATES PATENT AND TRADEMARK OFFICE
CERTIFICATE OF CORRECTION

PATENT NO. : 8,572,053 B2
APPLICATION NO. : 12/963914
DATED : October 29, 2013
INVENTOR(S) : Tofano Page 1 of 1

It is certified that error appears in the above-identified patent and that said Letters Patent is hereby corrected as shown below:

In the Claims

In column 12, line 13 delete "one-to-man" and insert --one-to-many--.

In column 12, line 16 delete "structure ent" and insert --structure entry--.

In column 12, line 55 delete "one-to-man" and insert --one-to-many--.

Signed and Sealed this
Twentieth Day of May, 2014

Michelle K. Lee
*Deputy Director of the United States Patent and Trademark Office*